United States Patent
Aziz et al.

(10) Patent No.: US 8,040,984 B2
(45) Date of Patent: Oct. 18, 2011

(54) METHODS AND APPARATUS FOR IMPROVED JITTER TOLERANCE IN AN SFP LIMIT AMPLIFIED SIGNAL

(75) Inventors: Pervez M. Aziz, Dallas, TX (US); Adam B. Healey, Newburyport, MA (US); Mohammad S. Mobin, Orefield, PA (US); Gary E. Schiessler, Allentown, PA (US); Gregory W. Sheets, Breinigsville, PA (US); Lane A. Smith, Easton, PA (US); Paul H. Tracy, Lehigh, PA (US); Geoffrey Zhang, Allentown, PA (US)

(73) Assignee: Agere System Inc., Allentown, PA (US)

( * ) Notice: Subject to any disclaimer, the term of this patent is extended or adjusted under 35 U.S.C. 154(b) by 869 days.

(21) Appl. No.: 11/967,602

(22) Filed: Dec. 31, 2007

(65) Prior Publication Data

US 2009/0168940 A1  Jul. 2, 2009

(51) Int. Cl.
*H04L 25/08* (2006.01)
*H04L 7/10* (2006.01)
*H04L 7/00* (2006.01)

(52) U.S. Cl. .................. 375/346; 375/345; 375/371
(58) Field of Classification Search .................. 375/316, 375/285, 346, 371, 354, 345, 224, 226; 370/503, 370/516
See application file for complete search history.

(56) References Cited

U.S. PATENT DOCUMENTS

| | | | |
|---|---|---|---|
| 6,684,033 B1 * | 1/2004 | Doh et al. | 398/202 |
| 2002/0085656 A1 | 7/2002 | Lee et al. | |
| 2003/0137355 A1 * | 7/2003 | Lin | 330/290 |
| 2007/0050805 A1 | 3/2007 | Rotenstein | |

FOREIGN PATENT DOCUMENTS

| | | |
|---|---|---|
| EP | 1 187 373 | 3/2002 |
| WO | WO 2006/032628 | 3/2006 |

OTHER PUBLICATIONS

HFDN_22.0, "Configuring the MAX 3861 AGC AMP as an SFP Limiting amplifier with RSSI," Maxim Integrated products, pp. 1-6, Apr. 2008.*
Matsuura et al., "Performance Improvement of Optical RZ-Receiver by Utilizing Semiconductor-Based Waveform Converter," Lasers and Electro-Optics Society, 17th Annual Meeting of the IEEE, vol. 1, pp. 392-393 (Nov. 11, 2008).
Kucharski et al., "Jitter Considerations in the Design of a 10-Gb/s Automatic Gain Control Amplifier," IEEE Transactions on Microwave Theory and Techniques, vol. 53, No. 2, pp. 590-597 (Feb. 1, 2005).

* cited by examiner

*Primary Examiner* — Tesfaldet Bocure
(74) *Attorney, Agent, or Firm* — Ryan, Mason & Lewis, LLP

(57) ABSTRACT

Methods and apparatus are provided for improving the jitter tolerance in an SFP limit amplified signal. Jitter tolerance is improved in a communications receiver by applying a received signal to an SFP limiting amplifier; and applying an output of the SFP limiting amplifier to a low pass filter to improve the jitter tolerance. The low pass filter optionally applies a programmable amount of attenuation to high frequency components of the output. The low pass filter slew rate controls (i.e., rotates) a data eye representation of the received signal to increase the data eye representation along a time axis. The noise margin of the received signal can optionally be improved by applying an output of the low pass filter to an all pass filter. A slew rate controller can evaluate the data eye statistics to determine a setting for the low pass filter.

20 Claims, 5 Drawing Sheets ated by

METHODS AND APPARATUS FOR IMPROVED JITTER TOLERANCE IN AN SFP LIMIT AMPLIFIED SIGNAL

FIELD OF THE INVENTION

The present invention is related to techniques for processing a received signal in a communication system and, more particularly, to techniques for improving jitter tolerance in a received signal.

BACKGROUND OF THE INVENTION

Digital communication receivers typically must sample an incoming waveform and then reliably detect the sampled data. Signals traveling through a dispersive medium typically suffer from group delay and attenuation. The group delay creates pulse spreading, inter-symbol interference and other noise. In order to compensate for such channel distortions, communication receivers often employ well-known filtering, amplification and equalization techniques. For example, zero equalization or decision-feedback equalization (DFE) techniques (or both) are often employed. Such equalization techniques are widely-used for removing intersymbol interference and to improve the noise margin. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein.

Communication receivers also often amplify a received signal with a small form factor pluggable (SFP) limiting amplifier. When the dispersive signal passes through the SFP limiting amplifier, however, the output of SFP limiting amplifier exhibits pulse width shrinkage resulting in loss of jitter tolerance. A need therefore exists for methods and apparatus for improving the jitter tolerance in an SFP limit amplified signal.

SUMMARY OF THE INVENTION

Generally, methods and apparatus are provided for improving the jitter tolerance in an SFP limit amplified signal. According to one aspect of the invention, jitter tolerance is improved in a communications receiver by applying a received signal to an SFP limiting amplifier; and applying an output of the SFP limiting amplifier to a low pass filter to improve the jitter tolerance. The low pass filter optionally applies a programmable amount of attenuation to high frequency components of the output. The low pass filter can optionally be applied by a pre-amplifier in the communications receiver.

The low pass filter slew rate controls (i.e., rotates) a data eye representation of the received signal to increase the data eye representation along a time axis. In this manner, the time margin and jitter tolerance of the received signal are improved. The noise margin of the received signal can optionally be improved by applying an output of the low pass filter to an all pass filter. In one embodiment, the data eye representation is a single-sided data eye representation. The single-sided data eye representation only contains transitions from a first binary value to a binary value of 0 or 1. A slew rate controller can evaluate the data eye statistics to determine a setting for the low pass filter.

A more complete understanding of the present invention, as well as further features and advantages of the present invention, will be obtained by reference to the following detailed description and drawings.

DETAILED DESCRIPTION

Figure 1:
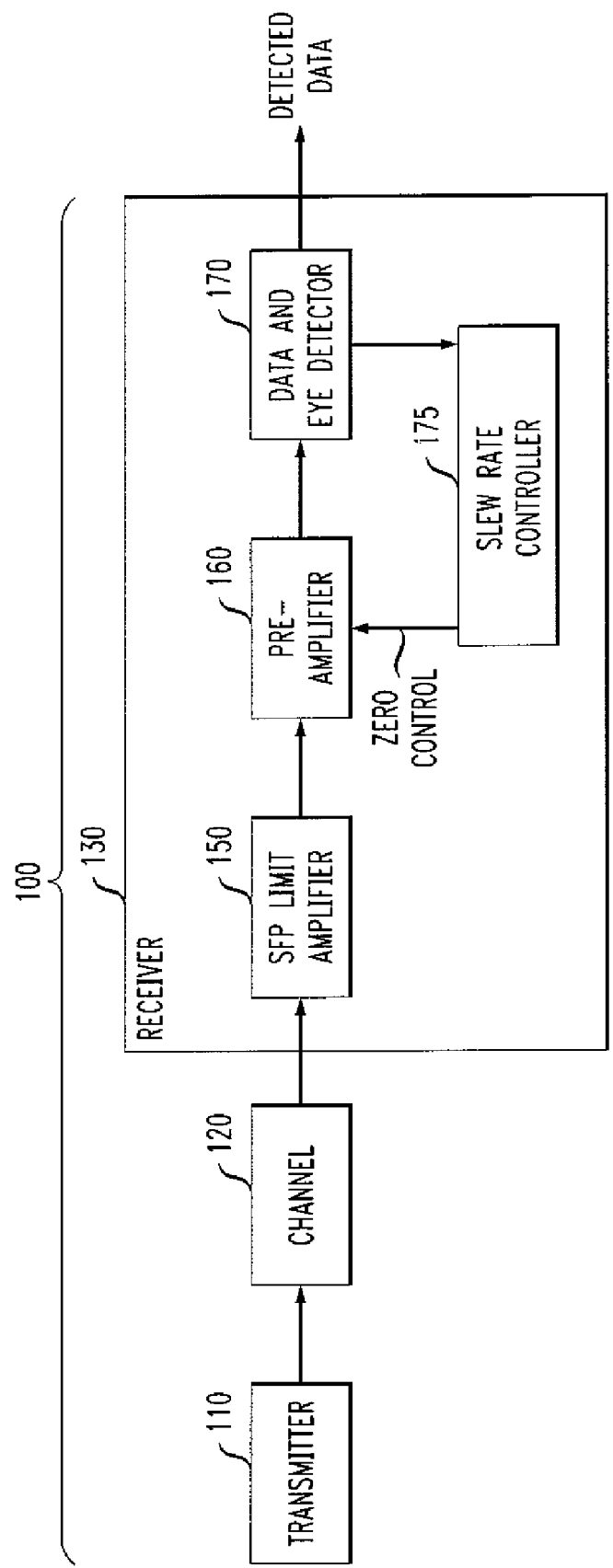
FIG. 1 is a block diagram of a communication system in which the present invention can operate.

The present invention provides methods and apparatus for improving the jitter tolerance in an SFP limit amplified signal. FIG. 1 is a block diagram of a communication system 100. As shown in FIG. 1, a transmitter 110 transmits data over a channel 120 for receipt by a receiver 130. The channel 120 can be any dispersive channel, such as a backplane, an optical link or an electrical connection, or a combination of the foregoing. Pre-emphasis techniques (not shown) are optionally applied in the transmitter 210 before the signal is transmitted over the channel 120. In addition, equalization techniques (not shown), such as zero equalization and/or decision feedback equalization (DFE) are optionally applied in the receiver 130.

As shown in FIG. 1, the receiver 130 includes an SFP limiting amplifier 150 and a pre-amplifier 160, in a known manner. The transfer characteristics of the pre-amplifier 160 are discussed further below in conjunction with FIGS. 2A and 2B. The received signal that is applied to the SFP limiting amplifier 150 is discussed further below in conjunction with FIGS. 3A and 3B. The output of the SFP limiting amplifier 150 is discussed further below in conjunction with FIGS. 4A and 4B.

The present invention recognizes that when the dispersive signal passes through the SFP limiting amplifier 150, the output of SFP limiting amplifier 150 exhibits pulse width shrinkage (PWS) resulting in loss of jitter tolerance. Thus, according to one aspect of the present invention, techniques are provided for improving the jitter tolerance in an SFP limit amplified signal. In particular, the pre-amplifier 160 filters the output of the SFP limiting amplifier 150 to improve the jitter tolerance, as discussed further below in conjunction with FIGS. 5A, 5B and 5C. As discussed hereinafter, a first stage of the pre-amplifier 160 applies a low pass filter, and a second stage of the pre-amplifier 160 optionally applies a high frequency boost.

The receiver 130 also includes a data and eye detector 170 for recovering the transmitted information. The data and eye detector 170 may be embodied, for example, using the data eye monitoring techniques described, for example, in U.S. patent application Ser. No. 11/540,946, filed Sep. 29, 2006, entitled "Method And Apparatus For Determining Latch Position For Decision-Feedback Equalization Using Single-Sided Eye," incorporated by reference herein.

In one exemplary embodiment, the data eye statistics generated by the data and eye detector 170 are processed by a slew rate controller 175 to evaluate the PWS and determine an appropriate zero control correction value. The zero control correction value will apply an appropriate amount of low pass filtering to offset the measured PWS. The slew rate controller 175 may be embodied, for example, using the slew rate control techniques described in U.S. patent application Ser. No. 11/367,964, filed Mar. 3, 2006, entitled "Method and Apparatus for Slew Rate Control," incorporated by reference herein, as modified herein to provide slew rate control using low pass filtering.

Figure 2A:
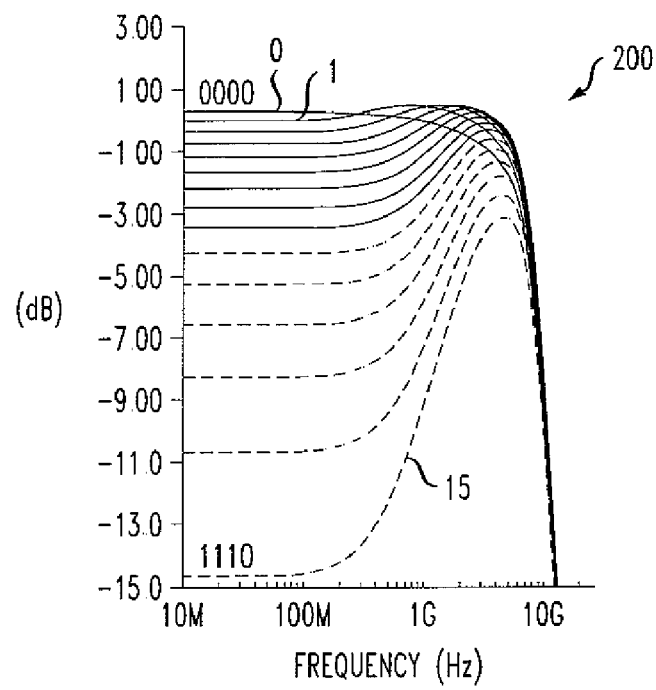
FIGS. 2A and 2B illustrate the transfer characteristics of the first and second stages, respectively, of the pre-amplifier of FIG. 1.
Figure 2B:
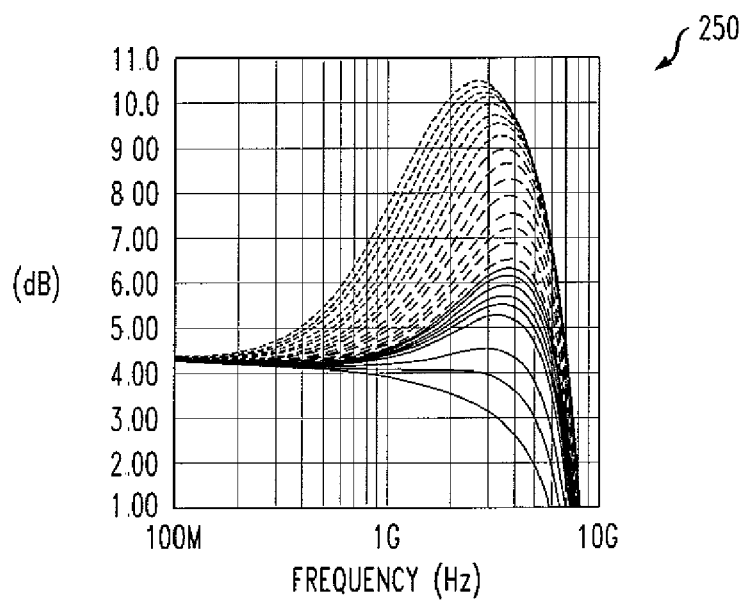

FIGS. 2A and 2B illustrate the transfer characteristics 200, 250 (amplitude as a function of frequency) of the first and second stages, respectively, of the pre-amplifier 160. As shown in FIG. 2A, in the first stage, the pre-amplifier 160 trades off between high frequency and low frequency transfer characteristics. If a high frequency boost is applied, the low frequency boost is lost and vise versa. The exemplary pre-amplifier 160 provides 16 "settings" of filter options (0-15) in the first stage Setting 0 applies the most low pass filtering (relative to the other settings) to attenuate the high frequency components of the applied signal. Setting 15 applies high pass filtering to attenuate the low frequency components. As shown in FIG. 2B, in the second stage, the pre-amplifier 160 provides a high frequency boost. In a conventional implementation, the pre-amplifier 160 employs low frequency attenuation and high frequency gain for equalization. As discussed below in conjunction with FIGS. 5A-5C, the present invention employs moderate to severe low pass filtering to attenuate the high frequency components and maintain the low frequency components) in the first stage of the pre-amplifier 160 in order to improve the jitter tolerance.

Figure 3A:
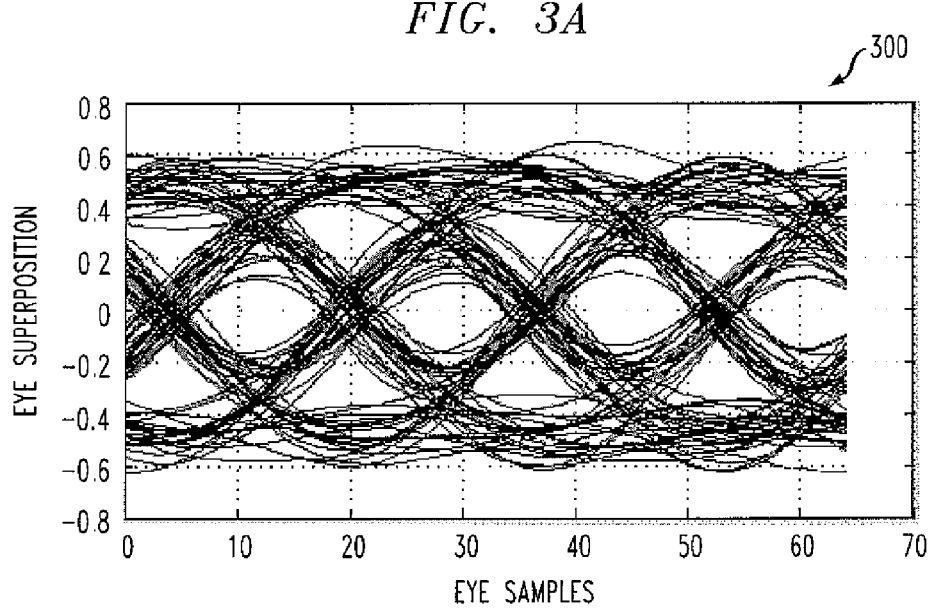
FIGS. 3A and 3B illustrate the received signal that is applied to the SFP limiting amplifier of FIG. 1.
Figure 3B:
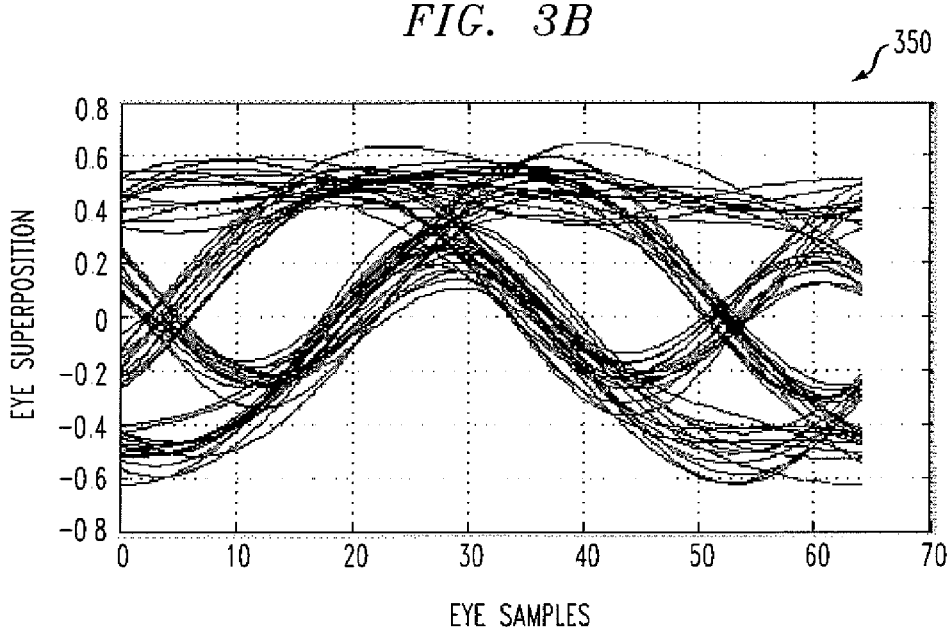

FIGS. 3A and 3B illustrate the received signal that is applied to the SFP limiting amplifier 150. FIG. 3A illustrates a classical data eye view 300 of the received signal and FIG. 3B illustrates a DFE data eye view 350 of the received signal. The data eye views 300, 350 can be obtained, for example, from a data eye monitor, such as those described in U.S. patent application Ser. No. 11/540,946, filed Sep. 29, 2006, entitled "Method And Apparatus For Determining Latch Position For Decision-Feedback Equalization Using Single-Sided Eye," incorporated by reference herein. While the classical data eye view 300 includes all data transitions, a DFE data eye view, also referred to as a single-sided eye view, opens up the data eye by containing only transitions from one binary value (i.e., only 1→x or 0→x transitions). The DFE data eye view extracts a larger DFE eye by constraining the data to only contain signal transitions from, for example, a binary value 1 to a binary value of 0 or 1 (referred to as 1→x), and inhibiting any signal transitions from a binary value of 0.

Figure 4A:
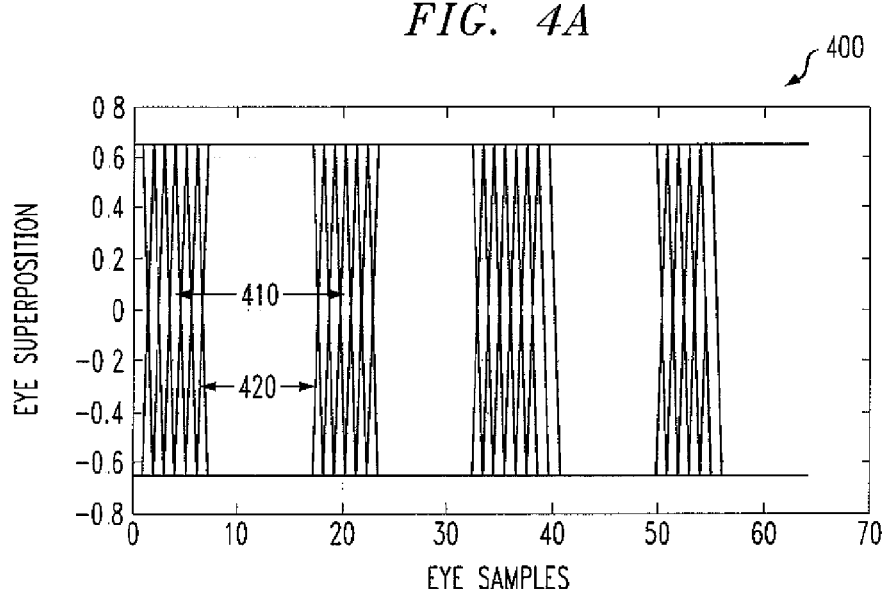
FIGS. 4A and 4B illustrate the output of the SFP limiting amplifier of FIG. 1.
Figure 4B:
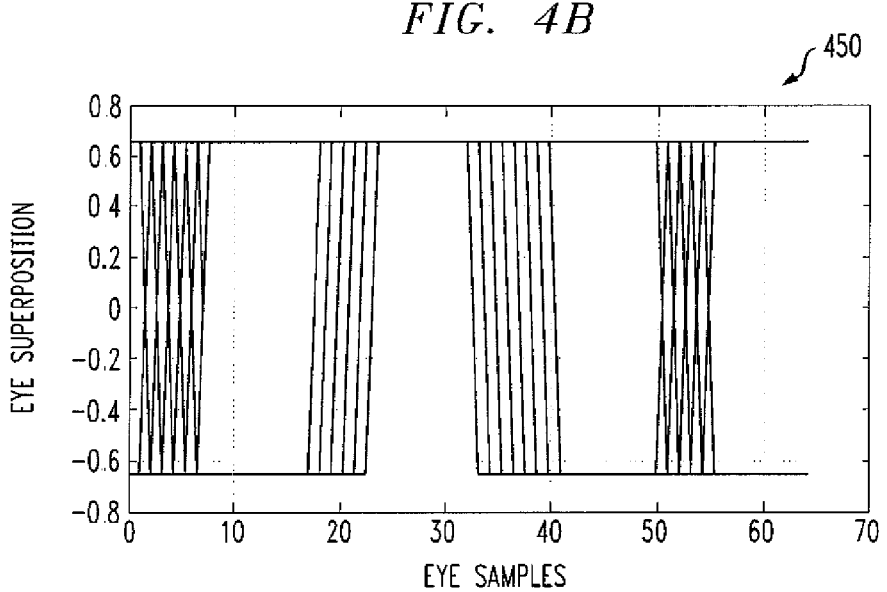

FIGS. 4A and 4B illustrate the output of the SFP limiting amplifier 150. FIG. 4A illustrates a classical data eye view 400 of the SFP limited signal and FIG. 4B illustrates a DFE data eye view 450 of the SFP limited signal. As shown in FIGS. 4A and 4B, the output 400, 450 of the SFP limiting amplifier 150 exhibits pulse width shrinkage resulting in loss of jitter tolerance. Thus, as seen in FIG. 4A, for example, the pulse width would approximately correspond to line 410 without pulse shrinkage, but the shrinkage from the SFP limiting amplifier 150 causes the pulse width to approximately correspond to line 420.

Low Pass Filtering to Improve Jitter Tolerance

Figure 5C:
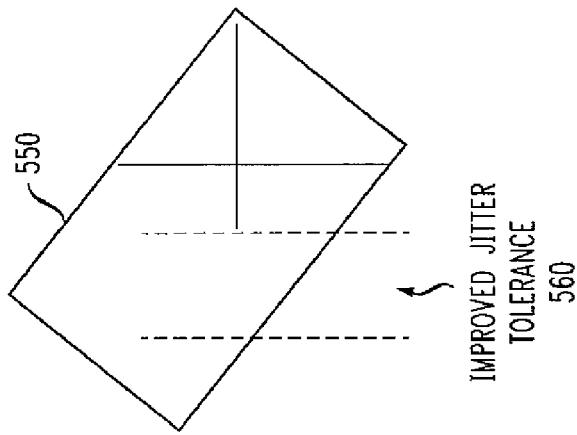
FIG. 5A illustrates the reduced (uncorrected) jitter tolerance at the output of the SFP limiting amplifier of FIG. 1, and FIGS. 5B-5C illustrate moderate jitter tolerance correction and severe jitter tolerance correction, respectively, in accordance with the present invention.
Figure 5B:
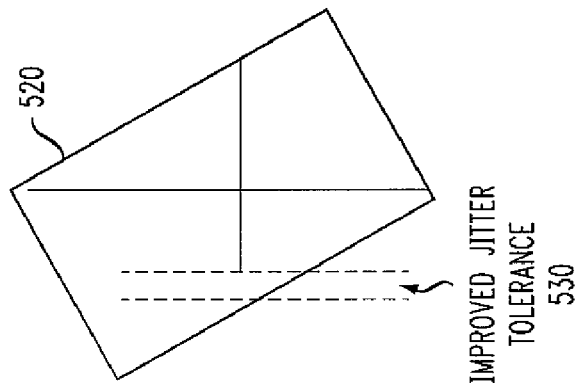
Figure 5A:
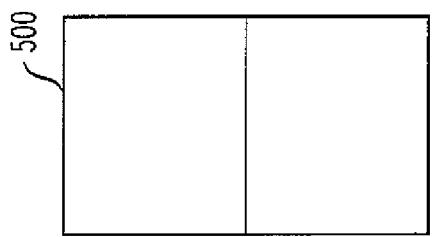

FIG. 5A illustrates the reduced (uncorrected) jitter tolerance at the output of the SFP limiting amplifier 150, and FIGS. 5B-5C illustrate moderate jitter tolerance correction and severe jitter tolerance correction, respectively, in accordance with the present invention. As shown in FIG. 5A, an exemplary data eye 500 at the output of the SFP limiting amplifier 150 exhibits pulse width shrinkage and has a jitter tolerance 510 corresponding to the width of the data eye 500.

As indicated above, the pre-amplifier 160 low pass filters the output of the SFP limiting amplifier 150 to improve the jitter tolerance. FIG. 5B corresponds to moderate jitter tolerance correction by applying moderate low pass filtering in the first stage of pre-amplifier 160, such as setting 5 of FIG. 2A. In this manner, the low pass filtering will expand the data eye 520 in the time domain by rotating the data eye 520, as shown in FIG. 5B (at the cost of vertical separation (noise margin), as discussed further below). When the data eye 520 rotates to the left, as shown in FIG. 5B, the horizontal spacing increases and is limited by the length of the diagonal length. The improvement in the jitter tolerance 530 corresponds to the increased spacing in the horizontal (time) direction. The rotation shown in FIG. 5B can be considered to decrease the Nyquist signal magnitude response and thereby slew rate limit the Nyquist signal, causing the rotation of the NRZ signal DFE eye and the increased jitter margin.

FIG. 5C corresponds to more severe jitter tolerance correction by applying severe low pass filtering in the first stage of pre-amplifier 160, such as setting 0 of FIG. 2A. In this manner, the low pass filtering will further expand the data eye 550 in the time domain by further rotating the data eye 550, as shown in FIG. 5C (again at the cost of vertical separation (noise margin), as discussed further below). When the data eye 550 rotates to the left, as shown in FIG. 5C, the horizontal spacing further increases and is limited by the length of the diagonal length. The improvement in the jitter tolerance 560 corresponds to the increased spacing in the horizontal (time) direction.

All Pass DC Gain to Improve Noise Margin

As indicated above, the low pass filtering in the first stage of the pre-amplifier 160 degrades the noise margin by attenuating the amplitude of the data eyes 520, 550, when the eyes are rotated. Thus, according to a further aspect of the present invention, a second stage of the pre-amplifier 160 optionally applies a high frequency boost to assert an all pass DC gain and to open up the vertical separation.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, fox example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, fob example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for improving jitter tolerance in a communications receiver, comprising:
   applying a received signal to an SFP limiting amplifier; and
   applying an amplified version of said received signal received from an output of said SFP limiting amplifier to a low pass filter to improve said jitter tolerance.

2. The method of claim 1, wherein said low pass filter applies a programmable amount of attenuation to high frequency components of said output.

3. The method of claim 1, wherein said low pass filter substantially maintains low frequency components of said output.

4. The method of claim 1, wherein said low pass filter is applied by a pre-amplifier in said communications receiver.

5. The method of claim 1, wherein said low pass filter rotates a data eye representation of said received signal to increase said data eye representation along a time axis.

6. The method of claim 1, wherein said low pass filter slew rate controls a data eye representation of said received signal to increase said data eye representation along a time axis.

7. The method of claim 6, wherein said slew rate control improves a time margin of said received signal.

8. The method of claim 6, wherein said slew rate control improves a jitter tolerance of said received signal.

9. The method of claim 6, wherein said data eye representation is a single-sided data eye representation.

10. The method of claim 9, wherein said single-sided data eye representation only contains transitions from a first binary value to a binary value of 0 or 1.

11. The method of claim 1, further comprising the step of applying an output of said low pass filter to an all pass filter to improve a noise margin of said received signal.

12. The method of claim 1, wherein a slew rate controller evaluates data eye statistics to determine a setting for said low pass filter.

13. A communications receiver, comprising:
   an SFP limiting amplifier for processing a received signal; and
   a low pass filter for filtering an amplified version of said received signal received from an output of said SFP limiting amplifier to improve jitter tolerance.

14. The apparatus of claim 13, wherein said low pass filter applies a programmable amount of attenuation to high frequency components of said output.

15. The apparatus of claim 13, wherein said low pass filter is a portion of a pre-amplifier in said communications receiver.

16. The apparatus of claim 13, wherein said low pass filter rotates a data eye representation of said received signal to increase said data eye representation along a time axis.

17. The apparatus of claim 13, wherein said low pass filter slew rate controls a data eye representation of said received signal to increase said data eye representation along a time axis.

18. The apparatus of claim 13, further comprising an all pass filter for processing an output of said low pass filter to improve a noise margin of said received signal.

19. A slew rate control method for improving jitter tolerance in a communications receiver that processes a received signal with an SFP limiting amplifier, comprising:
   determining a degree of high frequency attenuation to apply to an output of said SFP limiting amplifier based on a data eye monitor, wherein said SFP limiting amplifier amplifies said received signal; and
   applying said determined high frequency attenuation to said amplified version of said received signal using a low pass filter to improve said jitter tolerance.

20. The slew rate control method of claim 19, wherein said low pass filter slew rate controls a data eye representation of said received signal to increase said data eye representation along a time axis.

* * * * *

UNITED STATES PATENT AND TRADEMARK OFFICE
CERTIFICATE OF CORRECTION

PATENT NO.         : 8,040,984 B2                                    Page 1 of 1
APPLICATION NO.    : 11/967602
DATED              : October 18, 2011
INVENTOR(S)        : Pervez M. Aziz It is certified that error appears in the above-identified patent and that said Letters Patent is hereby corrected as shown below:

Title Page, Item (75), Inventors, Paul H. Tracy, residence "Lehigh, PA" should be replaced by -- Schnecksville, PA --.

Signed and Sealed this
Twenty-fifth Day of December, 2012

David J. Kappos
*Director of the United States Patent and Trademark Office*